(12) United States Patent
Müller et al.

(10) Patent No.: US 11,399,325 B2
(45) Date of Patent: Jul. 26, 2022

(54) HIGH-GAIN BEAM HANDOVER

(71) Applicant: Telefonaktiebolaget LM Ericsson (publ), Stockholm (SE)

(72) Inventors: Walter Müller, Upplands Väsby (SE); Rasmus Axén, Linköping (SE); Carola Faronius, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 25 days.

(21) Appl. No.: 16/650,246

(22) PCT Filed: Oct. 6, 2017

(86) PCT No.: PCT/SE2017/050978
§ 371 (c)(1),
(2) Date: Mar. 24, 2020

(87) PCT Pub. No.: WO2019/070174
PCT Pub. Date: Apr. 11, 2019

(65) Prior Publication Data
US 2021/0204182 A1    Jul. 1, 2021

(51) Int. Cl.
*H04W 4/00* (2018.01)
*H04W 36/00* (2009.01)
*H04B 7/06* (2006.01)
*H04L 1/00* (2006.01)
*H04W 36/30* (2009.01)

(52) U.S. Cl.
CPC .... *H04W 36/00837* (2018.08); *H04B 7/0695* (2013.01); *H04L 1/0003* (2013.01); *H04W 36/30* (2013.01)

(58) Field of Classification Search
None
See application file for complete search history.

(56) References Cited

U.S. PATENT DOCUMENTS

| | | |
|---|---|---|
| 2009/0098874 A1 | 4/2009 | Goransson et al. |
| 2016/0337916 A1 | 11/2016 | Deenoo et al. |
| 2017/0054479 A1* | 2/2017 | Sang .............. C07D 413/10 |
| 2017/0195027 A1 | 7/2017 | Baek et al. |

(Continued)

FOREIGN PATENT DOCUMENTS

CN      108235444 B  *  9/2021  ............ H04W 74/00

OTHER PUBLICATIONS

International Search Report and Written Opinion issued in International Application No. PCT/SE2017/050978 dated Jul. 18, 2018 (10 pages).

(Continued)

*Primary Examiner* — Suhail Khan
(74) *Attorney, Agent, or Firm* — Rothwell, Figg, Ernst & Manbeck, P.C.

(57) ABSTRACT

In one aspect, a network (e.g., a TRP) (150) uses handover triggering information to detect whether a handover triggering condition is present before a radio link fails, and initiates a handover upon detecting the handover triggering condition. In another aspect, a target TRP (152) is provided with beam generating information that enables the target TRP (152) to produce a high-gain beam for use in communicating with a UE (101) without having to perform a beam refinement procedure.

11 Claims, 15 Drawing Sheets

(56) References Cited

U.S. PATENT DOCUMENTS

2020/0068616 A1* 2/2020 Qian ................ H04W 74/0833

OTHER PUBLICATIONS

Intel Corporation, "Measurements in NR", 3GPP TSG RAN WG2 Meeting #96, R2-168511, Reno, Nevada, Nov. 14-18, 2016 (6 pages).
Ericsson, "Measurement events Cx in NR," 3GPP TSG-RAN WG2 Meeting #99bis, Tdoc R2-1711339 uploaded to www.3gpp.org/ftp/tsg_ran/WG2_RL2/TSGR2_99bis/Docs/ on Sep. 28, 2017 (4 pages).

* cited by examiner

HIGH-GAIN BEAM HANDOVER

CROSS REFERENCE TO RELATED APPLICATION(S)

This application is a 35 U.S.C. § 371 National Stage of International Patent Application No. PCT/SE2017/050978, filed Oct. 6, 2017, and designating the United States.

TECHNICAL FIELD

Disclosed are embodiments related to handover of a user equipment (UE) in a wireless communication system employing high-gain beams.

BACKGROUND

The next generation mobile wireless communication system, which is referred to as "5G," will support a diverse set of use cases and a diverse set of deployment scenarios. 5G will encompass an evolution of today's 4G networks and the addition of a new, globally standardized radio-access technology known as "New Radio" (NR).

The diverse set of deployment scenarios includes deployment at both low frequencies (100s of MHz), similar to LTE today, and very high frequencies (mm waves in the tens of GHz). At high frequencies, propagation characteristics make achieving good coverage challenging. One solution to the coverage issue is to employ beamforming (e.g., high-gain beamforming) to achieve satisfactory link budget.

Beamforming (or, more generally, precoding) is an important technology in future radio communication systems. It can improve performance both by increasing the received signal strength, thereby improving the coverage, and by reducing unwanted interference, thereby improving the capacity. Beamforming can be applied both in a transmitter and a receiver.

In a transmitter, beamforming involves configuring the transmitter to transmit the signal in a specific direction (or a few directions) and not in other directions. In a receiver, beamforming involves configuring the receiver to receive signals from a certain direction (or a few directions) and not from other directions. When beamforming is applied in both the transmitter and the receiver for a given communication link, the combination of the beam used by the transmitter to transmit a signal to the receiver and the beam used by the receiver to receive the signal is referred to as a beam-pair link (BPL). Generally, the beamforming gains are related to the widths of the used beams: a relatively narrow beam provides more gain than a wider beam. A BPL can be defined for downlink (DL) and uplink (UL) separately or jointly based on reciprocity assumptions.

For a more specific description of beamforming, one typically talks about beamforming weights (a.k.a., antenna weights) rather than beams. On the transmission side, the signal to be transmitted is multiplied with a set of beamforming weights (e.g., complex constants) before being distributed to the individual antenna elements. For example, there may be a separate beamforming weight for each antenna element, which allows maximum freedom in shaping the transmission beam given the fixed antenna array. The set of beamforming weights is referred to as a beam vector or precoding vector. Correspondingly, on the receiving side, the received signal from each antenna element is multiplied separately with beamforming weights before the signals are combined. However, in the context of the present text, the description is easier to follow if the somewhat simplified notion of beams, pointing in certain physical directions, is adopted.

Beamforming generally requires some form of beam management, such as beam search, beam refinement, and/or beam tracking, to determine what UL and/or DL transmit (TX) and receive (RX) beams to use for communication between two units. Typically, the two units are 1) an access network node (ANN) (a.k.a., transmission and reception point (TRP)), such as, for example, a 5G base station (gNB) or other base station, and 2) a user equipment (UE) (i.e., a wireless communication device (WCD), such as, for example, a smartphone, a tablet, a sensor, a smart appliance (or other Internet-of-Things (IoT) device), etc., that is capable of wireless communication with a TRP).

Accordingly, a TRP typically needs to perform measurements in order to know where to concentrate the radio energy to provide the best radio link towards the UE. Typically, to create a high-gain beam, this is performed by stepwise refinement (similar to link adaptation in general) where a broader beam (or more robust link modulation, when comparing to link adaptation) is first used, and, then based on measurement report(s) of that beam, a narrower beam can be created, until the optimal beam refinement has completed and no more narrowing of the beam will improve the situation for the radio link between the TRP and the UE.

In certain scenarios it might not be possible to just rely on a broad beam to pick up any traffic, as the coverage of such beam might be too weak for a UE to hear. In that case a two or more narrower beams may be used to increase coverage, possibly separated in time (sometimes referred to as beam sweeping). To avoid unnecessary interference in the network it is good practice to try to keep the occurrence of beams that are there just for detection reasons at a low pace, but frequent enough to prevent too slow response times.

A handover procedure is used to move a UE from one cell to another (e.g., from a source TRP to a target TRP). It is expected that NR handover will be quite similar to Long Term Evolution (LTE) handovers. Using measurements, a source TRP can decide when it is appropriate to move a UE to a target TRP.

SUMMARY

There are several problems that may arise when a source TRP uses a high-gain beam to serve a UE. For example, radio link conditions between the source TRP and the UE can deteriorate very rapidly and result in a radio link failure (i.e., a failure of the high-gain beam). For example, radio link conditions can deteriorate very rapidly when a UE moves around a corner and the high-gain beam cannot reach the UE because it is blocked. This rapid radio link failure may prevent the UE from transmitting a measurement report to the source TRP (under normal rules the UE should send a report to the source TRP when the UE detects that a target beam from a target TRP is X dBm better than the high-gain beam used by the source TRP). Additionally, when the UE is configured to receive the high-gain beam, it may be difficult for the UE to even hear the target beam, as the target beam is usually a weak broad beam. Another problem associated with the use of high-gain beams is that beam refinement is typically used to create the high-gain beam and this beam refinement can cause extra delay until the radio link between the TRP and UE is optimal. For UEs that have high bandwidth demands and are low latency sensitive this delay could degrade the service.

Advantageously, this disclosure provides embodiments for overcoming one or more of the above problems. For example, some embodiments address the high-gain beam failure scenario, some embodiments address the "extra delay" problem caused by beam refinement, and some embodiments alleviate both issues. For example, in some embodiments the high-gain beam failure problem is alleviated by having the network use handover triggering information to detect a handover triggering condition (e.g., a condition under which a failure of the high-gain beam is expected to occur shortly if no action is taken) before the radio link fails, and initiate a handover upon detecting the handover triggering condition. Hence, advantageously, it is possible for a source TRP to initiate handover to a target TRP at the right time to avoid the "around the corner drop scenario."

As another example, in some embodiments the "extra delay" problem is addressed by enabling a target TRP to directly create an optimal beam without performing the conventional beam refinement procedure by providing to the target TRP beam generating information for use in directly producing a high-gain beam. In some embodiments, both options are available—that is, the target TRP is enabled to create a high-gain beam without needing to perform the conventional beam refinement procedure, and the target TRP can also use a wide beam (non-high-gain beam) with beam refinement. Thus, in the event the high-gain beam fails, the wide beam may anyhow succeed.

In some embodiments, the hand over triggering information and the beam generating information is learned over time via a "learning function." The learning function discovers the conditions that were present just before the failure and the conditions that occur shortly after in the target TRP. For example, a relation between the optimal high-gain beam in source TRP with the optimal high-gain beam in the target TRP is created. The learning function is not intrusive, so it can run during the normal ongoing procedures and therefore can be allowed to run as long as needed. The learning function is not required to be included in the source TRP or the target TRP, the learning function can be located anywhere (as long as the learning function can communicate with the serving and target TRPs). Source TRP will tell the learning function how a high-gain beam looked like just before the reestablishment happened (as part of the context fetch or outgoing handover procedure or via a new procedure). The target TRP will complete the reestablishment or handover and perform beam refinement until a new high-gain beam is optimal. The resulting high-gain beam will be stored together with the source TRP's optimal high-gain beam. When a UE being served by the source TRP matches the high-gain beam characteristics, then the source TRP has the option to perform a handover to the target TRP including the high-gain beam that should be used by the target TRP. This action is separated from the normal LTE UE event type of procedure where the UE reports that a neighbor cell has better signal noise ratio than current source cell.

Accordingly, in one aspect there is provided first handover method. In some embodiments, the first handover method includes a source TRP obtaining first handover triggering information identifying a first handover triggering condition, the first handover triggering information comprising first beam information indicating a first set of beam characteristics. The method further includes the source TRP communicating with a user equipment using a high-gain beam having a second set of beam characteristics. The method further includes the source TRP obtaining second beam information indicating the second set of beam characteristics. The method further includes the source TRP determining whether the first handover triggering condition is present, wherein determining whether the first handover triggering condition is present comprises determining whether the second set of beam characteristics of the high-gain beam that is being used by the source TRP to communicate with the UE matches the first set of beam characteristics. The method further includes the source TRP initiating a handover of the UE from the source TRP to the target TRP as a result of determining that the first handover triggering condition is present.

In another aspect there is provided a second handover method. In some embodiments, the second handover method includes a source TRP determining that a user equipment that the source TRP is serving should be handed over to a target TRP. The method also includes the source TRP obtaining beam generating information for enabling the target TRP to produce a high-gain beam for use in communicating with the UE. The method also includes the source TRP performing a handover procedure for handing over the UE to the target TRP as a result of determining that the UE should be handed over to the target TRP, wherein performing the handover procedure comprises the source TRP transmitting the beam generating information to the target TRP.

In another aspect there is provided a third handover method. In some embodiments, the third handover method includes a target TRP receiving beam generating information transmitted by a source TRP as a result of the source TRP determining that a first handover triggering condition is present with respect to a UE being served by the source TRP and the target TRP using the beam generating information to produce a high-gain beam for use in communicating with the UE.

One advantage of the embodiments that address the beam failure issue is that the embodiments make it unnecessary for the UE to measure on a neighbor cell when currently being served by a high-gain beam. Another advantage is that the embodiments can solve the "around the corner" problem by initiating handover before the high-gain beam is lost. One advantage of the embodiments that address "extra delay" issue is that the embodiments enable a target cell to produce a high-gain beam for a UE without beam refinement, which leads to decrease latency and therefore improved performance. An advantage shared by all of the embodiments is that they reduce configuration of cell relation parameters used for handover and simplifies network planning.

BRIEF DESCRIPTION OF THE DRAWINGS

The accompanying drawings, which are incorporated herein and form part of the specification, illustrate various embodiments.

DETAILED DESCRIPTION

As used herein the indefinite articles "a" an "an" mean at least one.

Figure 1:
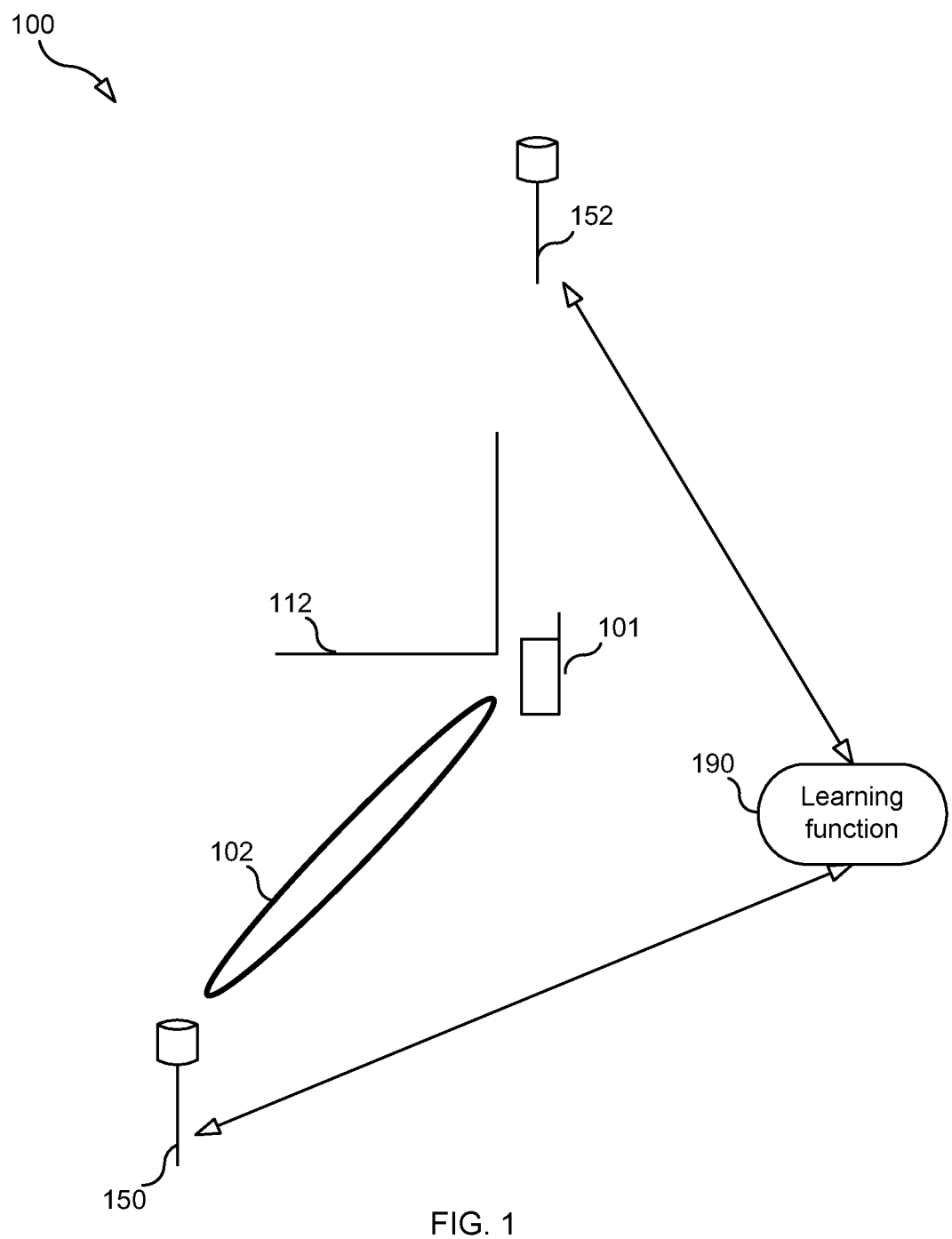
FIG. 1 illustrates a TRP communicating with a UE using a high-gain beam.

FIG. 1 illustrates a network 100 having a source TRP 150, a target TRP 152, and a learning function 190. While learning function 190 is shown in FIG. 1 as being separate and apart from the TRPs, this need not be the case as one or more of the TRPs may include learning function 190. FIG. 1 illustrates an example scenario in which TRP 150 is serving a UE 101 using a high-gain beam. That is, TRP 150 uses a high-gain beam 102 to transmit data to UE 101 and/or receive data transmitted by UE 101.

Figure 2:
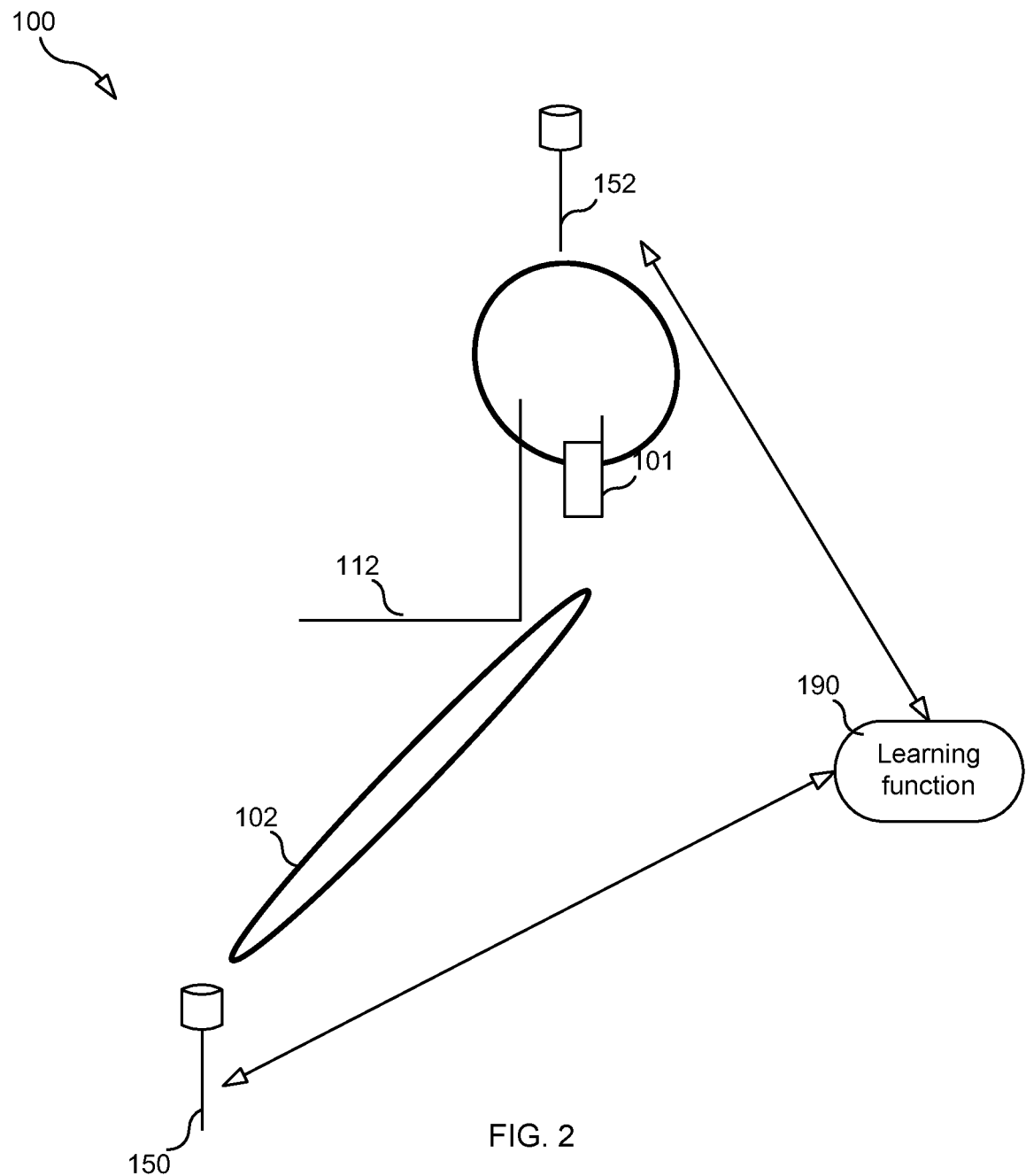
FIG. 2 illustrates a beam link failure scenario.

FIG. 2 illustrates the scenario in which TRP 150 is not able to communicate with UE 101 using any high-gain beam because a structure 112 (e.g., an office building) is between TRP 150 and UE 101. In this scenario, UE 101 may be served by target TRP 152 because UE 101 has moved an area within the coverage of TRP 152. As discussed above, when UE 101 moves around the corner of structure 112, a link (e.g., a DL link and/or an UL link) between TRP 150 and UE 101 goes from good to unreachable almost immediately. In some situations when this occurs the UE 101 must be perform a link reestablishment procedure before it can send data to the network and/or receive data from the network. As illustrated in FIG. 2, by performing the link reestablishment procedure, UE 101 can detect target TRP 152 and initiate the establishment of a new radio link with TRP 152. TRP 152 may fetch UE context information for UE 101 from TRP 150 and initiate a beam refinement procedure so that TRP 152 can establish a new high-gain beam with which to communicate with UE 101. The reestablishment procedure takes some amount of time and during this time the UE 101 may have no service from the network. It is thus advantageous to avoid this scenario.

In some embodiments, source TRP 150 determines that beam 102 has failed during the reestablishment procedure. For example, TRP 150 may determine that the beam 102 has failed when TRP 150 receives from TRP 152 a request for UE 101's context information. Advantageously, after learning that beam 102 has failed, TRP 150 can obtain beam information comprising communication parameters that TRP 150 was using to communicate with UE 101 before the failure and provide to learning function 190 the beam information.

The communication parameters include the beam vector that TRP 150 was using to communicate with UE 101 before the failure. The communication parameters may also include information indicating the modulation and coding scheme (MCS) that TRP 150 was using to communicate with UE 101 before the failure. TRP 150 may also provide to learning function UE reporting information that was reported by UE 101 prior to the failure, such as, for example, Channel Quality Indicator (CQI), Rank Indicator (RI), Precoding Matrix Indicator (PMI), phase tracking information (PTI), power headroom (PHR), timing advance (TA), Reference Symbol Received Power (RSRP) indicator, Reference Symbol Received Quality (RSRQ) indicator, block error information, bit error information, reference signal (RS) signal-to-interference-plus-noise ratio (SINR), subframe timing difference (SSTD), etc. TRP 150 can be configured to provide such UE reporting information and beam information to learning function 190 each time TRP 150 detects the failure of a high-gain beam.

In this way, learning function 190 can create a database containing the beam information and UE reporting information, if any, and use the database to deduce handover triggering information identifying a handover triggering condition (e.g., a condition under which a failure of a high-gain beam is expected). In some embodiments, the handover triggering information comprises beam information (e.g., a beam vector). The handover triggering information may further include MCS information indicating an MCS and/or one or more of the above mentioned pieces of UE reporting information reported by the UE (e.g., CQI, RI, PMI, etc.).

This handover triggering information can be used by TRP 150 to determine whether TRP 150 should initiate a handover of a UE that TRP 150 is currently serving using a high-gain beam. That is, TRP 150 can use the handover triggering information and information related to the UE to determine whether the handover triggering condition is now occurring with respect to the UE. For example, TRP 150 can use the handover triggering information and the information related to the UE to determine whether the handover triggering condition is present by comparing the handover triggering information with the information related to the UE.

For instance, the handover triggering information may include a first beam vector and the information related to the UE may include a second beam vector, and TRP 150 may determine whether the handover triggering condition is present by performing a process that includes: comparing the first beam vector with the second beam vector to determine whether the second beam vector and the first beam vector match (i.e., are sufficiently similar) and comparing the first MCS information with the second MCS information to determine whether they match. The beam vectors can be said to match if, for example, the cosine of the angle between the vectors (a.k.a., the cosine similarity) is not less than a threshold (T) (e.g., T=1).

In response to determining that the handover triggering condition is present with respect to the UE, TRP 150 can initiate a handover of the UE to target TRP 152 (or another target TRP). For example, TRP 150 can initiate the handover by transmitting to TRP 152 a handover message. In some embodiments, the handover message comprises beam generating information for enabling TRP 152 to produce a high-gain beam for use in communicating with the UE that is the subject of the handover message. The beam generating information may be a high-gain beam vector or it may be information for enabling TRP 152 to retrieve a previously saved high-gain beam vector.

For example, the learning function 190 may produce for TRP 150 a data set as illustrated in table 1 below, which data set includes a set of handover triggering information.

TABLE 1

| Index | Hand Over Triggering Information for TRP 150 | Target TRP |
|---|---|---|
| 1 | Beam-vector-1, RSRP-1, MSC-1, etc. | TRP 152 |
| 2 | Beam-vector-2, RSRP-2, MSC-2, etc | TRP 152 |
| 3 | Beam-Vector-3, RSRP-3, MSC-3, etc. | TRP abc |

As shown in the table, learning function has identified first handover triggering information identified by index 1, second handover triggering information identified by index 2, and third handover triggering information identified by index 3. This data set can be stored in a storage unit accessible to TRP 150. When TRP 150 determines that it should initiate a handover of a UE to TRP 152 because, for example, the information related to the UE (e.g., the beam vector being used for the UE, the MSC being used, and the last reported RSRP from the UE) matches the second handover triggering information, TRP 150 may send to TRP 152 a handover message comprising the index value of "2". TRP 152 may then check a database to see whether TRP 152 has previously stored in the database a record that associates a high-gain beam vector associated with index value of "2". If such a record exists, TRP 152 can then use the high-gain beam vector to communicate with the UE without having to perform a beam refinement procedure in order to generate a high-gain beam vector. As another example, if the information related to the UE matches the third handover triggering information, TRP 150 may send to TRP abc a handover message comprising the index value of "3".

As another example, the learning function 190 may produce a set of handover triggering information for TRP 150 as shown in table 2 below.

TABLE 2

| Index | Hand Over Triggering Information for TRP 150 | Target TRP | Target High-Gain Beam Vector (TBV) |
|---|---|---|---|
| 1 | Beam-vector-1, RSRP-1, etc. | TRP 152 | TBV-1 |
| 2 | Beam-vector-2, RSRP-2, etc | TRP 152 | TBV-2 |
| 3 | Beam-Vector-3, RSRP-3, etc. | TRP abc | TBV-3 |

Table 2 is the same as table 1 expect that table 2 has an additional column for storing a target high-gain beam vector (TBV). In this embodiment, when TRP 150 determines that it should initiate a handover of a UE to TRP 152 because, for example, the information related to the UE matches the second handover triggering information, TRP 150 may send to TRP 152 a handover message comprising TBV-2, which is a high-gain beam vector that TRP 150 can use to communicate with the UE without having to perform a beam refinement procedure in order to generate a high-gain beam vector.

Leaning function 190 can generate the data set shown in table 2 based on information that it receives from TRP 150, TRP 152, and TRP abc. As discussed above, TRP 150 may be configured such that, in response to detecting that the high-gain beam TRP 150 was using to communicate with a UE has failed, TRP 150 provides to learning function 190 certain UE related information (e.g., the beam vector corresponding to the high-gain beam, UE identifier, UE reporting information, timestamp). And learning function 190 can collect this information and use the collected information to produce the set of handover triggering information. Additionally, each time TRP 152 establishes a high-gain beam with a UE as a result of the UE performing the reestablishment procedure due to losing a high-gain beam link with TRP 150, TRP 152 can provide to the learning function the high-gain beam vector for the high-gain beam together with a UE identifier and possible a timestamp. In this way, learning function can correlate these "target" high-gain beam vectors with certain handover triggering information.

Figure 3:
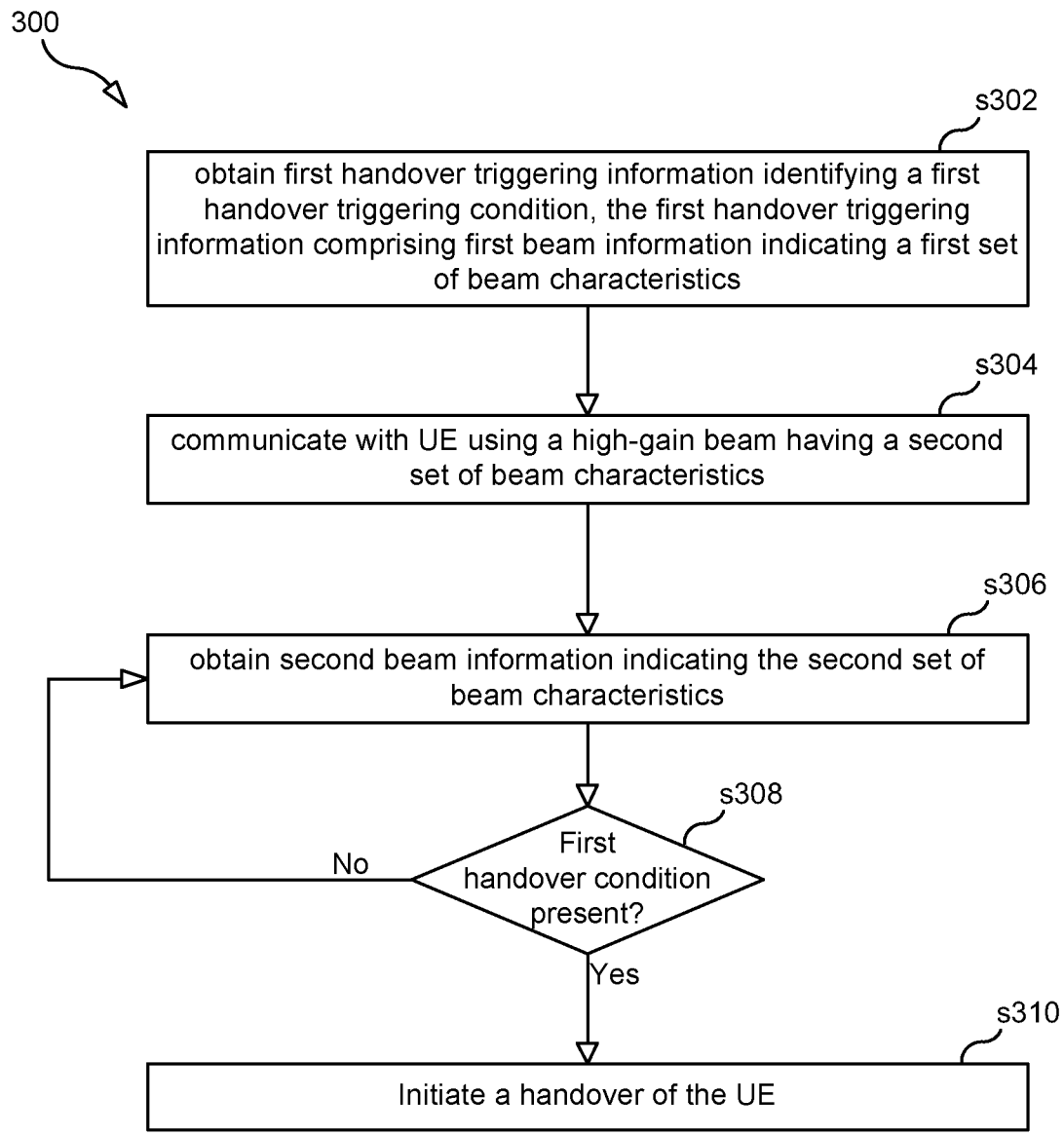
FIG. 3 is a flow chart illustrating a process according to one embodiment.

FIG. 3 is a flow chart illustrating a handover process 300 according to some embodiments. Process 300 may begin with step s302, in which TRP 150 obtains first handover triggering information identifying a first handover triggering condition, the first handover triggering information comprising first beam information indicating a first set of beam characteristics. For example the first beam information may include first beam direction information (e.g., a first beam vector). In some embodiments, obtaining first handover triggering information comprises TRP 150 obtaining from a learning function a data set (see e.g., the data set shown in Table 1 or Table 2) comprising the first handover triggering information. In some the data set further comprises beam generating information (e.g., index value or target beam vector) that is associated in the data set with the first handover triggering information.

In step s304, TRP 150 communicates with UE using a high-gain beam having a second set of beam characteristics.

In step s306, TRP 150 obtains second beam information indicating the second set of beam characteristics. For example the second beam information may include second beam direction information (e.g., a second beam vector).

In step s308, TRP 150 determines whether the first handover triggering condition is present.

In step s310, which is performed by TRP 150 as a result of TRP 150 determining that the first handover triggering condition is present, TRP 150 initiates a handover of the UE from TRP 150 to TRP 152. In some embodiments, the step of initiating the handover of the UE from TRP 150 to TRP 152 comprises TRP 150 transmitting the beam generating information to TRP 152.

In this embodiment, determining whether the first handover triggering condition is present comprises TRP 150 determining whether the second set of beam characteristics matches the first set of beam characteristics. In some embodiments, determining whether the second set of beam characteristics matches the first set of beam characteristics comprises determining whether the second beam direction information is substantially identical to the first beam direction information. In some embodiments, the first beam direction information comprises a first beam vector, the second beam direction information comprises a second beam vector, and determining whether the second beam direction information is substantially identical to the first beam direction information comprises comparing the first beam vector with the second beam vector (e.g., determining a cosine similarity).

In some embodiments, the first set of beam characteristics comprises a first modulation and coding scheme (MCS), the second set of beam characteristics further comprises a second MCS, and determining whether the second set of beam characteristics matches the first set of beam characteristics further comprises determining whether the first MCS is substantially identical to the second MCS.

In some embodiments, the first handover triggering information is associated with beam generating information for use in producing a high-gain beam, and the step of initiating the handover of the UE from TRP 150 to TRP 152 comprises transmitting the beam generating information to TRP 152. In some embodiments, the process also includes TRP 152 receiving the beam generating information using the received beam generating information to produce a high-gain beam for communicating with the UE. In some embodiments, the beam generating information comprises a high-gain beam vector, while in other embodiments the beam generating information comprises an index value for enabling TRP 152 to retrieve a high-gain beam vector.

Figure 4:
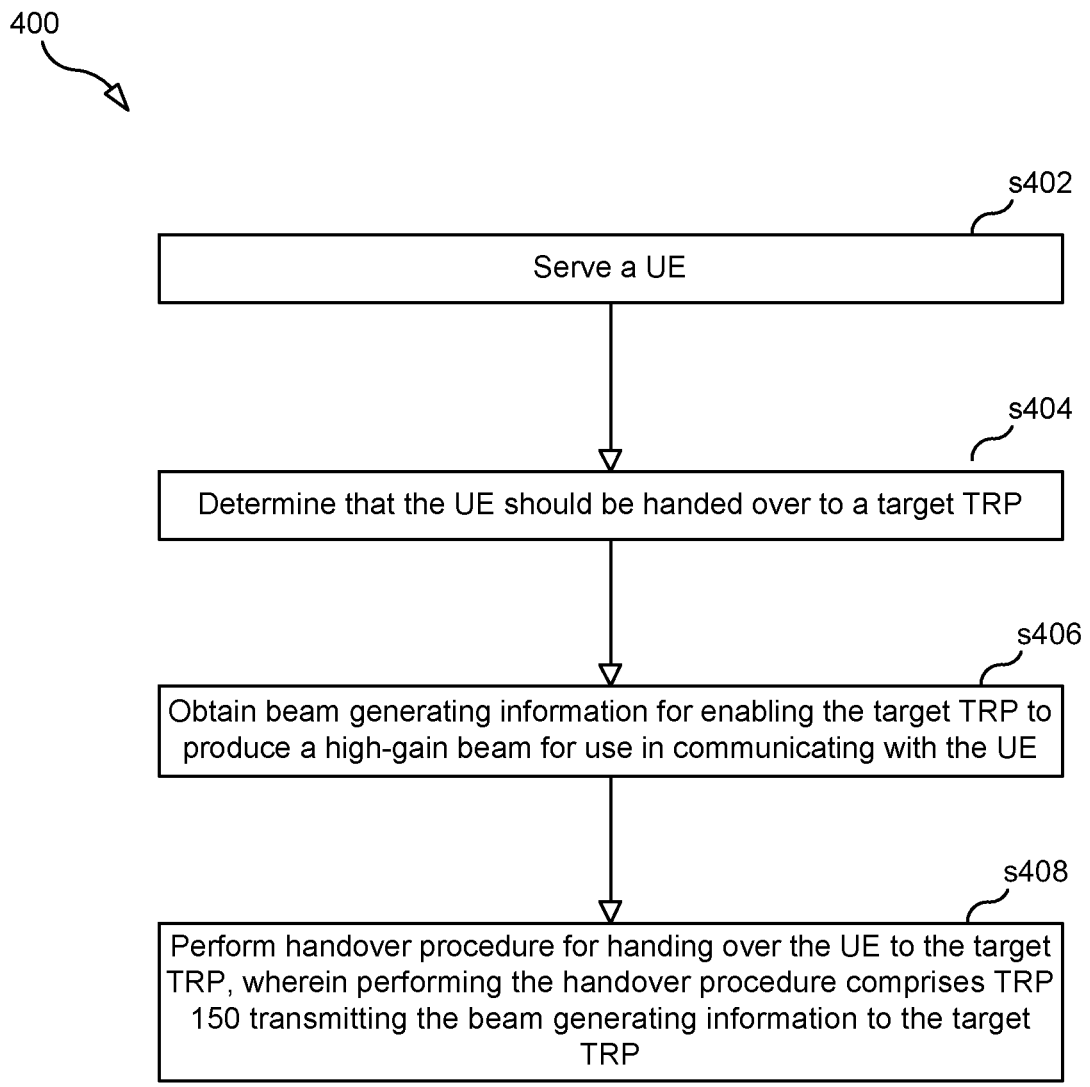
FIG. 4 is a flow chart illustrating a process according to one embodiment.

FIG. 4 is a flow chart illustrating a handover process 400 according to some embodiments. Process 400 may begin with step s402, in which TRP 150 serves a UE.

In step s404, TRP 150 determines that the UE should be handed over to TRP 152.

In step s406, TRP 150 obtains beam generating information for enabling TRP 152 to produce a high-gain beam for use in communicating with the UE.

In step s408, TRP 150 performs a handover procedure for handing over the UE to TRP 152 as a result of determining that the UE should be handed over to TRP 152, wherein performing the handover procedure comprises TRP 150 transmitting the beam generating information to TRP 152.

The method may further include, TRP 152 receiving the beam generating information (step s410); and TRP 152 using the received beam generating information to produce the high-gain beam for communicating with the UE (step s412).

In some embodiments, the beam generating information comprises one of: a high-gain beam vector and an index value. In embodiments in which the beam generating information is an index value, TRP 152 uses the index value to retrieve a beam vector associated with the index value. The TRP 152 may retrieve the beam vector from a local storage unit a centralized remote storage unit. For example, TRP 152 may transmit to a server with access to the remote storage unit a query comprising the index value and the server uses the index value to obtain the beam vector from remote storage unit and then provide the retrieved beam vector to TRP 152.

In some embodiments, process 400 further comprises TRP 150 communicating with the UE using a high-gain beam, and the step of determining that the UE should be handed over to TRP 152 comprises: 1) TRP 150 obtaining first handover triggering information identifying a first handover triggering condition, the first handover triggering information comprising first beam information; 2) TRP 150 obtaining second beam information associated with the high-gain beam; and 3) TRP 150 determining whether the second beam information matches the first beam information.

Figure 5:
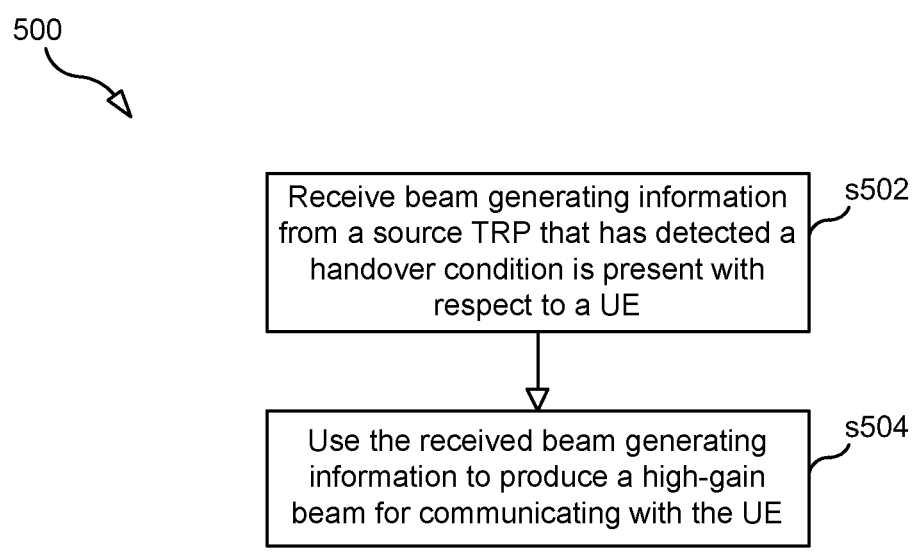
FIG. 5 is a flow chart illustrating a process according to one embodiment.

FIG. 5 is a flow chart illustrating a handover process 500 according to some embodiments. Process 500 may begin with step s502, in which TRP 152 receives beam generating information (e.g., a beam vector or an index value) transmitted by TRP 150 as a result of TRP 150 determining that a first handover triggering condition is present with respect to a UE being served by TRP 150. In step s504, TRP 152 uses the beam to generating information to produce a high-gain beam for use in communicating with the UE. In some embodiments, TRP 152 produces the high-gain beam without obtaining measurement reports from the UE.

Figure 6:
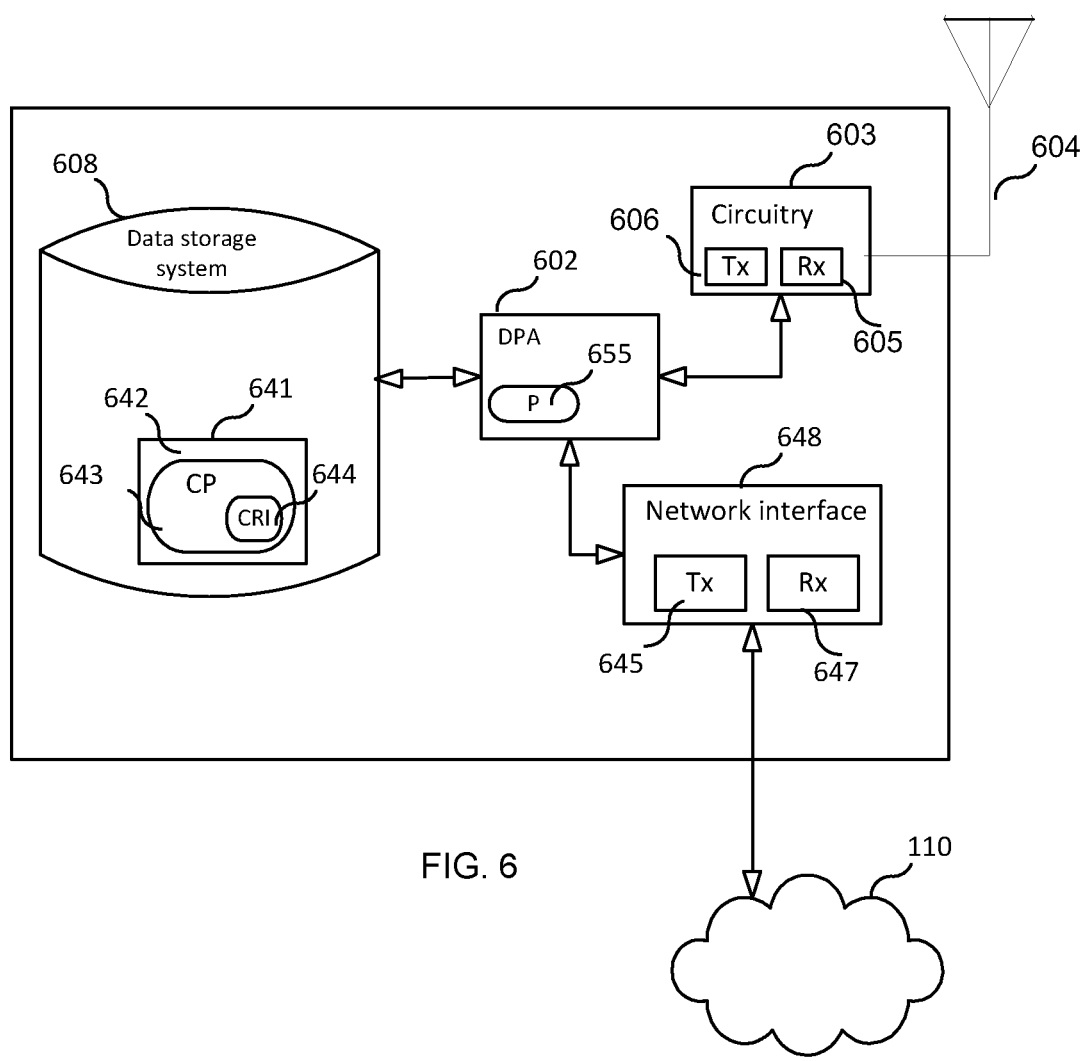
FIG. 6 is a block diagram of an access network node according to one embodiment.

FIG. 6 is a block diagram of a TRP (e.g. TRP 150 or TRP 152) according to some embodiments. As shown in FIG. 6, TRP may comprise: a data processing apparatus (DPA) 602, which may include one or more processors (P) 655 (e.g., a general purpose microprocessor and/or one or more other processors, such as an application specific integrated circuit (ASIC), field-programmable gate arrays (FPGAs), and the like); a network interface 648 comprising a transmitter (Tx) 645 and a receiver (Rx) 647 for enabling the TRP to transmit data to and receive data from other nodes connected to a network 110 (e.g., an Internet Protocol (IP) network) to which network interface 648 is connected; circuitry 603 (e.g., radio transceiver circuitry comprising an Rx 605 and a Tx 606) coupled to an antenna system 604 for wireless communication with UEs); and local storage unit (a.k.a., "data storage system") 608, which may include one or more non-volatile storage devices and/or one or more volatile storage devices (e.g., random access memory (RAM)). In embodiments where DPA 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, but not limited to, magnetic media (e.g., a hard disk), optical media, memory devices (e.g., random access memory, flash memory), and the like. In some embodiments, the CRI 644 of computer program 643 is configured such that when executed by data processing apparatus 602, the CRI causes TRP to perform steps described herein (e.g., steps described herein with reference to the flow charts and/or message flow diagrams). In other embodiments, TRP may be configured to perform steps described herein without the need for code. That is, for example, DPA 602 may consist merely of one or more ASICs. Hence, the features of the embodiments described herein may be implemented in hardware and/or software.

Figure 7:
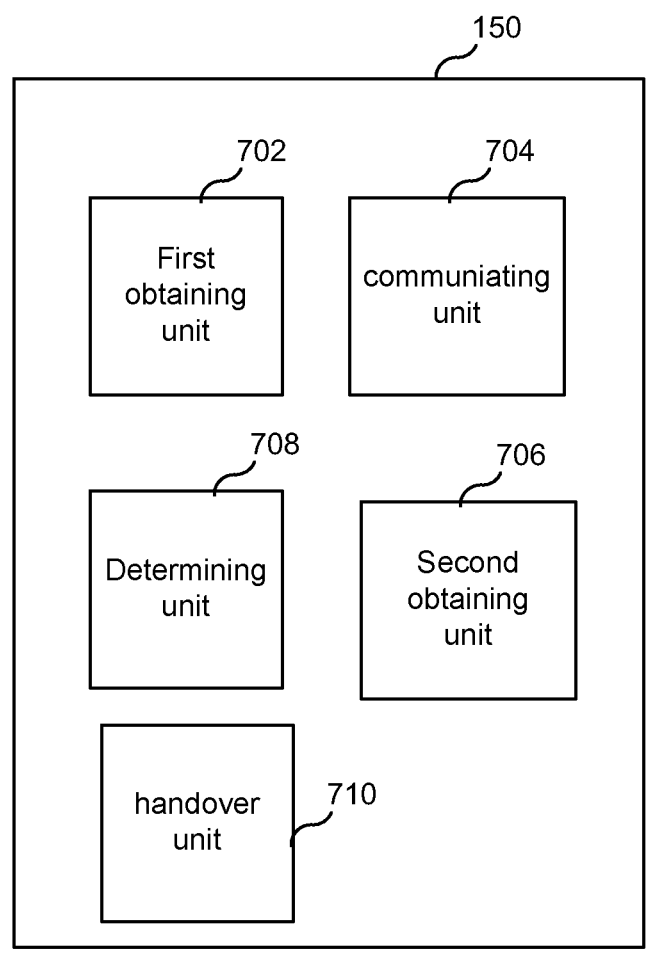
FIG. 7 is a diagram showing functional units of an access network node according to one embodiment.

FIG. 7 is a diagram showing functional units of TRP 150 according to some embodiments. As shown in FIG. 7, the TRP 150 may include: a first obtaining 702 unit for obtaining first handover triggering information identifying a first handover triggering condition, the first handover triggering information comprising first beam information indicating a first set of beam characteristics; a communicating unit 704 for communicating with a user equipment, UE, using a high-gain beam having a second set of beam characteristics; a second obtaining unit 706 for obtaining second beam information indicating the second set of beam characteristics; a determining unit 708 for determining whether the first handover triggering condition is present (e.g., determining whether the second set of beam characteristics of the high-gain beam that is being used by the source TRP to communicate with the UE matches the first set of beam characteristics); and a handover unit 710 configured such that, as a result of the determining unit 708 determining that the first handover triggering condition is present, the handover unit initiates a handover of the UE from the source TRP to the target TRP.

Figure 8:
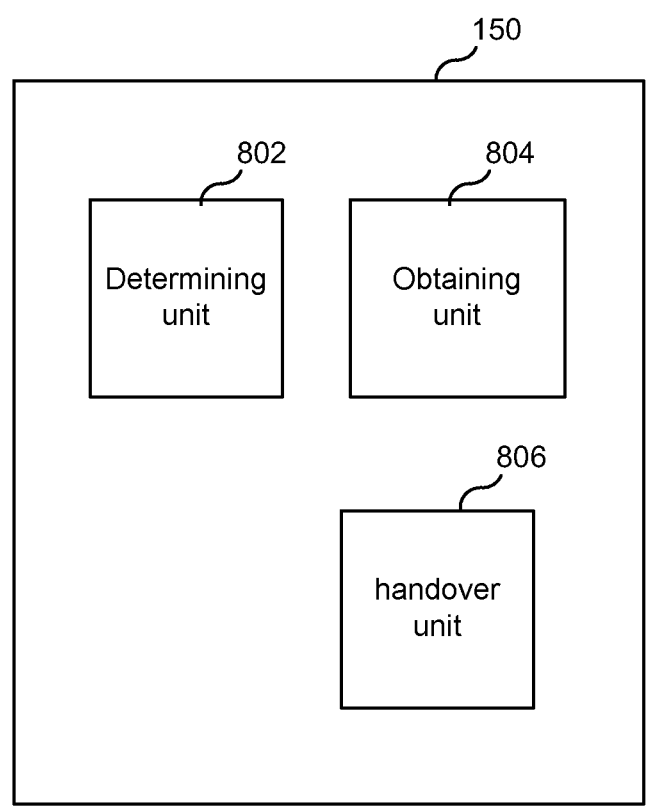
FIG. 8 is a diagram showing functional units of an access network node according to another embodiment.

FIG. 8 is a diagram showing functional units of TRP 150 according to some other embodiments. As shown in FIG. 8, the TRP 150 may include: a determining unit 802 for determining that a UE that the source TRP is serving should be handed over to the target TRP; an obtaining unit 804 for obtaining beam generating information for enabling the target TRP to produce a high-gain beam for use in communicating with the UE; and a handover unit 806 for performing a handover procedure for handing over the UE to the target TRP as a result of determining that the UE should be handed over to the target TRP, wherein performing the handover procedure comprises the source TRP transmitting the beam generating information to the target TRP.

Figure 9:
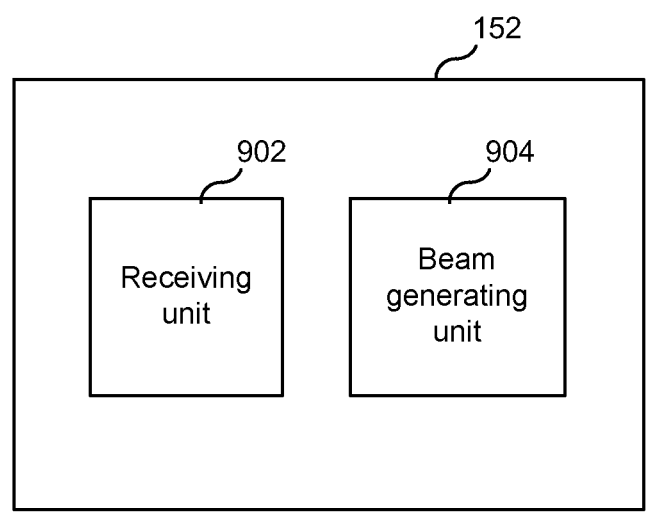
FIG. 9 is a diagram showing functional units of an access network node according to another embodiment.

FIG. 9 is a diagram showing functional units of TRP 152 according to some other embodiments. As shown in FIG. 9, the TRP 152 may include: a receiving unit 902 for receiving beam generating information transmitted by the source TRP 150 as a result of the source TRP determining that a first handover triggering condition is present with respect to a user equipment being served by the source TRP; and a beam generating unit 904 configured to use the received beam generating information to produce a high-gain beam for use in communicating with the UE.

Figure 10:
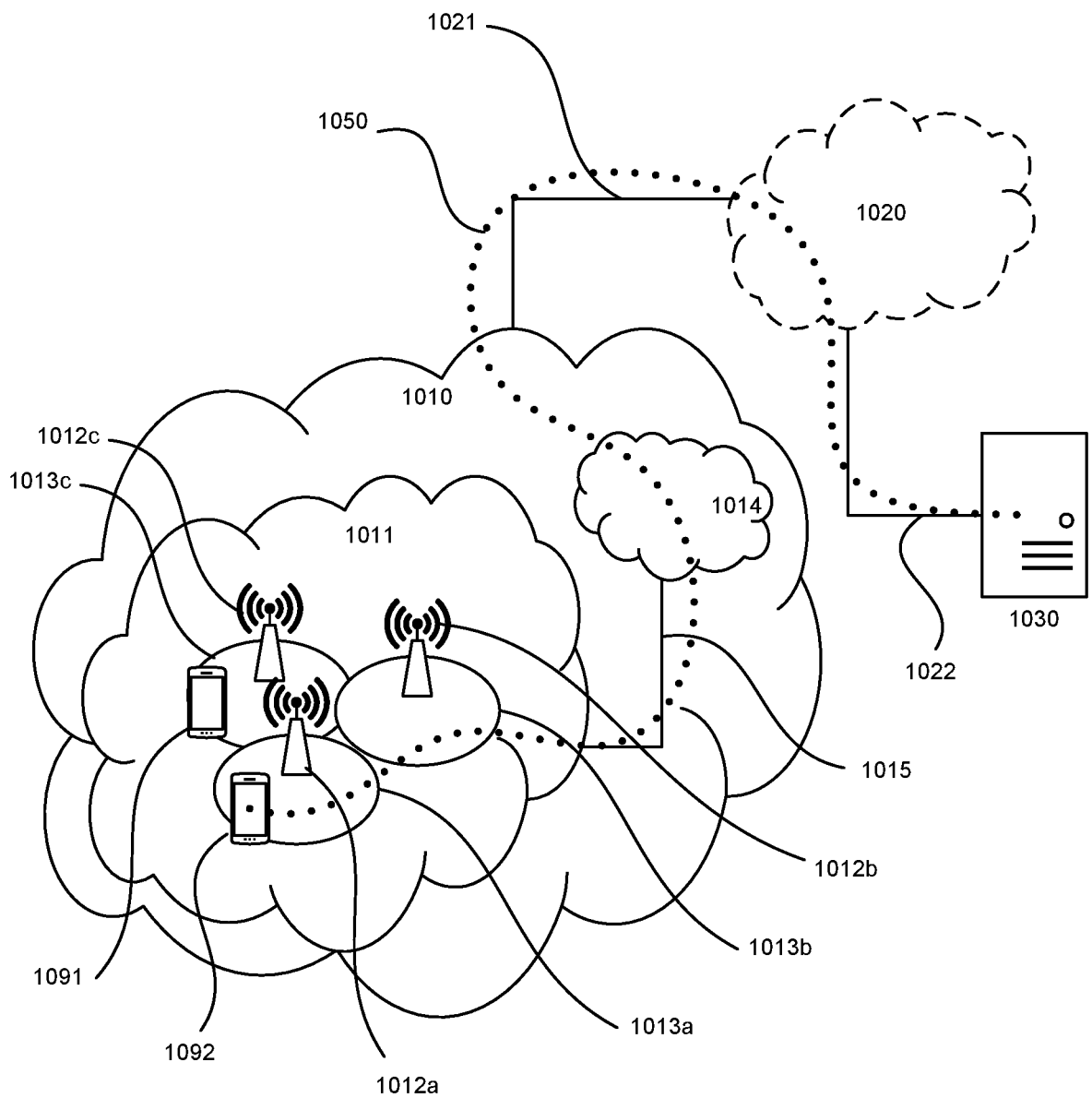
FIG. 10 schematically illustrates a telecommunication network connected via an intermediate network to a host computer.

FIG. 10 illustrates a telecommunication network connected via an intermediate network to a host computer in accordance with some embodiments. With reference to FIG. 10, in accordance with an embodiment, a communication system includes telecommunication network 1010, such as a 3GPP-type cellular network, which comprises access network 1011, such as a radio access network, and core network 1014. Access network 1011 comprises a plurality of TRPs (hereafter base stations) 1012a, 1012b, 1012c, such as NBs, eNBs, gNBs or other types of wireless access points, each defining a corresponding coverage area 1013a, 1013b, 1013c. Each base station 1012a, 1012b, 1012c is connectable to core network 1014 over a wired or wireless connection 1015. A first UE 1091 located in coverage area 1013c is configured to wirelessly connect to, or be paged by, the corresponding base station 1012c. A second UE 1092 in coverage area 1013a is wirelessly connectable to the corresponding base station 1012a. While a plurality of UEs 1091, 1092 are illustrated in this example, the disclosed embodiments are equally applicable to a situation where a sole UE is in the coverage area or where a sole UE is connecting to the corresponding base station 1012.

Telecommunication network 1010 is itself connected to host computer 1030, which may be embodied in the hardware and/or software of a standalone server, a cloud-implemented server, a distributed server or as processing resources in a server farm. Host computer 1030 may be under the ownership or control of a service provider, or may be operated by the service provider or on behalf of the service provider. Connections 1021 and 1022 between telecommunication network 1010 and host computer 1030 may extend directly from core network 1014 to host computer 1030 or may go via an optional intermediate network 1020. Intermediate network 1020 may be one of, or a combination of more than one of, a public, private or hosted network; intermediate network 1020, if any, may be a backbone network or the Internet; in particular, intermediate network 1020 may comprise two or more sub-networks (not shown).

The communication system of FIG. 10 as a whole enables connectivity between the connected UEs 1091, 1092 and host computer 1030. The connectivity may be described as an over-the-top (OTT) connection 1050. Host computer 1030 and the connected UEs 1091, 1092 are configured to communicate data and/or signaling via OTT connection 1050, using access network 1011, core network 1014, any intermediate network 1020 and possible further infrastructure (not shown) as intermediaries. OTT connection 1050 may be transparent in the sense that the participating communication devices through which OTT connection 1050 passes are unaware of routing of uplink and downlink communications. For example, base station 1012 may not or need not be informed about the past routing of an incoming downlink communication with data originating from host computer 1030 to be forwarded (e.g., handed over) to a connected UE 1091. Similarly, base station 1012 need not be aware of the future routing of an outgoing uplink communication originating from the UE 1091 towards the host computer 1030.

Example implementations, in accordance with an embodiment, of the UE, base station and host computer discussed in the preceding paragraphs will now be described with reference to FIG. 11, which illustrates a host computer communicating via a base station with a user equipment over a partially wireless connection in accordance with some embodiments. In communication system 1100, host computer 1110 comprises hardware 1115 including communication interface 1116 configured to set up and maintain a wired or wireless connection with an interface of a different communication device of communication system 1100. Host computer 1110 further comprises processing circuitry 1118, which may have storage and/or processing capabilities. In particular, processing circuitry 1118 may comprise one or more programmable processors, application-specific integrated circuits, field programmable gate arrays or combinations of these (not shown) adapted to execute instructions. Host computer 1110 further comprises software 1111, which is stored in or accessible by host computer 1110 and executable by processing circuitry 1118. Software 1111 includes host application 1112. Host application 1112 may be operable to provide a service to a remote user, such as UE 1130 connecting via OTT connection 1150 terminating at UE 1130 and host computer 1110. In providing the service to the remote user, host application 1112 may provide user data which is transmitted using OTT connection 1150.

Communication system 1100 further includes base station 1120 provided in a telecommunication system and comprising hardware 1125 enabling it to communicate with host computer 1110 and with UE 1130. Hardware 1125 may include communication interface 1126 for setting up and maintaining a wired or wireless connection with an interface of a different communication device of communication system 1100, as well as radio interface 1127 for setting up and maintaining at least wireless connection 1170 with UE 1130 located in a coverage area (not shown in FIG. 11) served by base station 1120. Communication interface 1126 may be configured to facilitate connection 1160 to host computer 1110. Connection 1160 may be direct or it may pass through a core network (not shown in FIG. 11) of the telecommunication system and/or through one or more intermediate networks outside the telecommunication system. In the embodiment shown, hardware 1125 of base station 1120 further includes processing circuitry 1128, which may comprise one or more programmable processors, application-specific integrated circuits, field programmable gate arrays or combinations of these (not shown) adapted to execute instructions. Base station 1120 further has software 1121 stored internally or accessible via an external connection.

Communication system 1100 further includes UE 1130 already referred to. Its hardware 1135 may include radio interface 1137 configured to set up and maintain wireless connection 1170 with a base station serving a coverage area in which UE 1130 is currently located. Hardware 1135 of UE 1130 further includes processing circuitry 1138, which may comprise one or more programmable processors, application-specific integrated circuits, field programmable gate arrays or combinations of these (not shown) adapted to execute instructions. UE 1130 further comprises software 1131, which is stored in or accessible by UE 1130 and executable by processing circuitry 1138. Software 1131 includes client application 1132. Client application 1132 may be operable to provide a service to a human or nonhuman user via UE 1130, with the support of host computer 1110. In host computer 1110, an executing host application 1112 may communicate with the executing client application 1132 via OTT connection 1150 terminating at UE 1130 and host computer 1110. In providing the service to the user, client application 1132 may receive request data from host application 1112 and provide user data in response to the request data. OTT connection 1150 may transfer both the request data and the user data. Client application 1132 may interact with the user to generate the user data that it provides.

Figure 11:
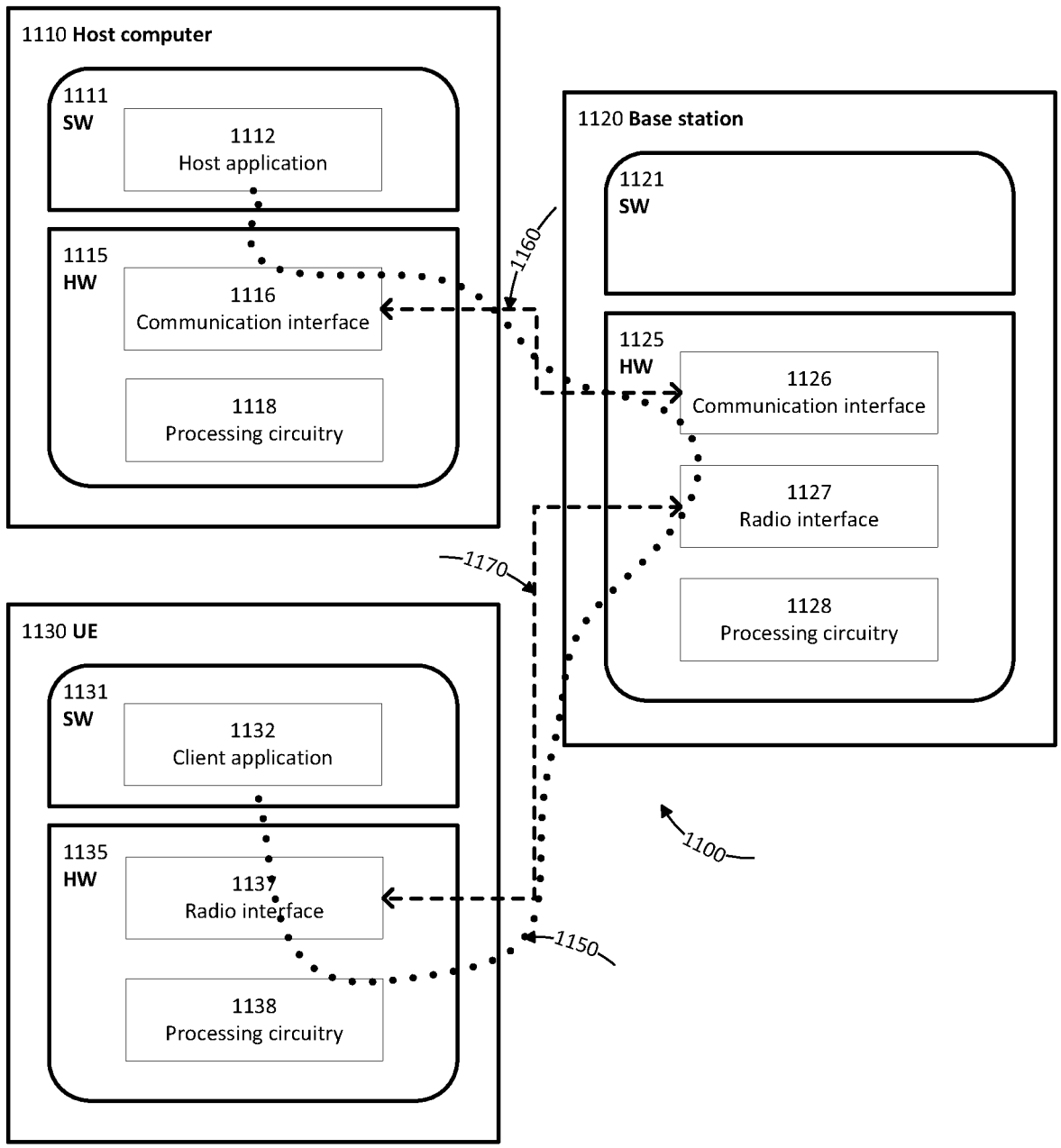
FIG. 11 is a generalized block diagram of a host computer communicating via a base station with a user equipment over a partially wireless connection.

It is noted that host computer 1110, base station 1120 and UE 1130 illustrated in FIG. 11 may be similar or identical to host computer 1030, one of base stations 1012a, 1012b, 1012c and one of UEs 1091, 1092 of FIG. 10, respectively. This is to say, the inner workings of these entities may be as shown in FIG. 11 and independently, the surrounding network topology may be that of FIG. 10.

In FIG. 11, OTT connection 1150 has been drawn abstractly to illustrate the communication between host computer 1110 and UE 1130 via base station 1120, without explicit reference to any intermediary devices and the precise routing of messages via these devices. Network infrastructure may determine the routing, which it may be configured to hide from UE 1130 or from the service provider operating host computer 1110, or both. While OTT connection 1150 is active, the network infrastructure may further take decisions by which it dynamically changes the routing (e.g., on the basis of load balancing consideration or reconfiguration of the network).

Wireless connection 1170 between UE 1130 and base station 1120 is in accordance with the teachings of the embodiments described throughout this disclosure. One or more of the various embodiments improve the performance of OTT services provided to UE 1130 using OTT connection 1150, in which wireless connection 1170 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 1150 between host computer 1110 and UE 1130, in response to variations in the measurement results. The measurement procedure and/or the network functionality for reconfiguring OTT connection 1150 may be implemented in software 1111 and hardware 1115 of host computer 1110 or in software 1131 and hardware 1135 of UE 1130, or both. In embodiments, sensors (not shown) may be deployed in or in association with communication devices through which OTT connection 1150 passes; the sensors may participate in the measurement procedure by supplying values of the monitored quantities exemplified above, or supplying values of other physical quantities from which software 1111, 1131 may compute or estimate the monitored quantities. The reconfiguring of OTT connection 1150 may include message format, retransmission settings, preferred routing etc.; the reconfiguring need not affect base station 1120, and it may be unknown or imperceptible to base station 1120. Such procedures and functionalities may be known and practiced in the art. In certain embodiments, measurements may involve proprietary UE signaling facilitating host computer 1110's measurements of throughput, propagation times, latency and the like. The measurements may be implemented in that software 1111 and 1131 causes messages to be transmitted, in particular empty or 'dummy' messages, using OTT connection 1150 while it monitors propagation times, errors etc.

Figure 12:
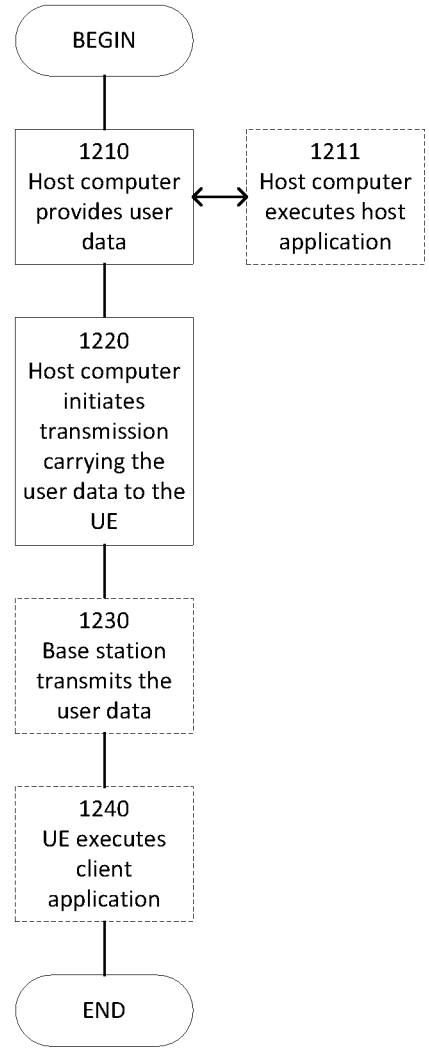
FIG. 12 is a flowchart illustrating a method implemented in a communication system including a host computer, a base station and a user equipment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1210, the host computer provides user data. In substep 1211 (which may be optional) of step 1210, the host computer provides the user data by executing a host application. In step 1220, the host computer initiates a transmission carrying the user data to the UE. In step 1230 (which may be optional), the base station transmits to the UE the user data which was carried in the transmission that the host computer initiated, in accordance with the teachings of the embodiments described throughout this disclosure. In step 1240 (which may also be optional), the UE executes a client application associated with the host application executed by the host computer.

Figure 13:
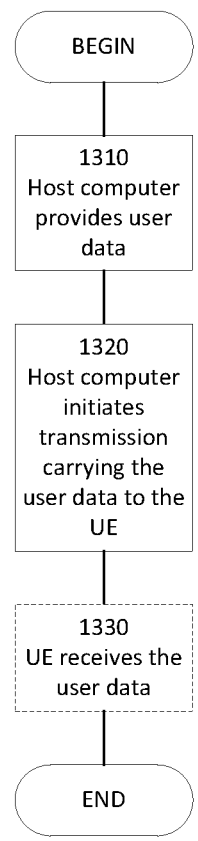
FIG. 13 is a flowchart illustrating a method implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 1310 of the method, the host computer provides user data. In an optional substep (not shown) the host computer provides the user data by executing a host application. In step 1320, the host computer initiates a transmission carrying the user data to the UE. The transmission may pass via the base station, in accordance with the teachings of the embodiments described throughout this disclosure. In step 1330 (which may be optional), the UE receives the user data carried in the transmission.

Figure 14:
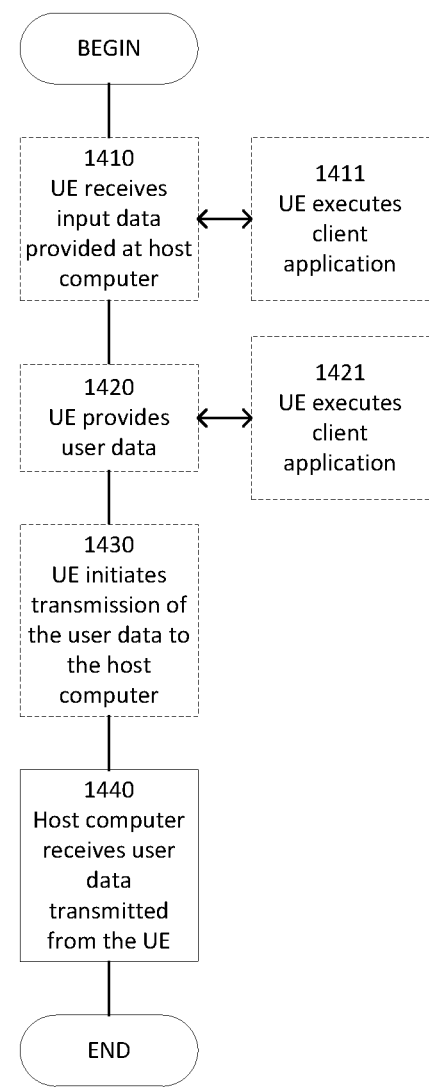
FIG. 14 is a flowchart illustrating a method implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1410 (which may be optional), the UE receives input data provided by the host computer. Additionally or alternatively, in step 1420, the UE provides user data. In substep 1421 (which may be optional) of step 1420, the UE provides the user data by executing a client application. In substep 1411 (which may be optional) of step 1410, the UE executes a client application which provides the user data in reaction to the received input data provided by the host computer. In providing the user data, the executed client application may further consider user input received from the user. Regardless of the specific manner in which the user data was provided, the UE initiates, in substep 1430 (which may be optional), transmission of the user data to the host computer. In step 1440 of the method, the host computer receives the user data transmitted from the UE, in accordance with the teachings of the embodiments described throughout this disclosure.

Figure 15:
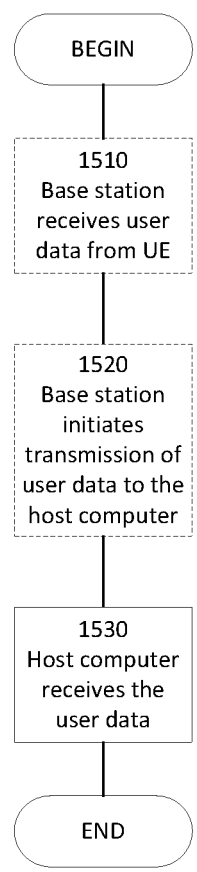
FIG. 15 is a flowchart illustrating a method implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1510 (which may be optional), in accordance with the teachings of the embodiments described throughout this disclosure, the base station receives user data from the UE. In step 1520 (which may be optional), the base station initiates transmission of the received user data to the host computer. In step 1530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A handover method in a wireless communication system comprising a source transmission and reception point (TRP) and a target TRP, the method comprising:
the source TRP obtaining first handover triggering information identifying a first handover triggering condition, the first handover triggering information comprising first beam information indicating a first set of beam characteristics;
the source TRP communicating with a user equipment (UE) using a high-gain beam having a second set of beam characteristics;
the source TRP obtaining second beam information indicating the second set of beam characteristics;
the source TRP determining whether the first handover triggering condition is present; and
as a result of determining that the first handover triggering condition is present, the source TRP initiating a handover of the UE from the source TRP to the target TRP, wherein
determining whether the first handover triggering condition is present comprises determining whether the second set of beam characteristics of the high-gain beam that is being used by the source TRP to communicate with the UE matches the first set of beam characteristics.

2. The method of claim 1, wherein
the first beam information comprises first beam direction information,
the second beam information comprises second beam direction information indicating the direction of the high-gain beam that is being used to communicate with the UE,
determining whether the second set of beam characteristics matches the first set of beam characteristics comprises determining whether the second beam direction information is substantially identical to the first beam direction information.

3. The method of claim 2, wherein
the first beam direction information comprises a first beam vector indicating a first direction,
the second beam direction information indicating the direction of the high-gain beam that is being used to communicate with the UE comprises a second beam vector indicating the direction of the high-gain beam, and
determining whether the second beam direction information is substantially identical to the first beam direction information comprises comparing the first beam vector with the second beam vector.

4. The method of claim 3, wherein
the first set of beam characteristics comprises at least one of: a first modulation and coding scheme (MCS) and a first information,
the second set of beam characteristics further comprises at least one of a second MCS and a UE reported information,
determining whether the second set of beam characteristics matches the first set of beam characteristics further comprises at least one of: determining whether the first MCS is substantially identical to the second MCS and determining whether the first information is substantially identical to the UE reported information, and
the UE reported information is one or more of: a CQI, a PMI, an RI, an RSRP value, an RSRQ value, PTI, RS SINR, PHR information, TA information, block error information, bit error information, subframe timing difference, and RS time difference, and time alignment information.

5. The method of claim 1, wherein
the first handover triggering information is associated with beam generating information for use in producing a high-gain beam, and
the step of initiating the handover of the UE from the source TRP to the target TRP comprises transmitting the beam generating information to the target TRP.

6. The method of claim 5, further comprising
the target TRP receiving the beam generating information; and
the target TRP using the received beam generating information to produce a high-gain beam for communicating with the UE.

7. The method of claim 6, wherein the beam generating information comprises a high-gain beam vector.

8. The method of claim 6, wherein the beam generating information comprises an index value for enabling the target TRP to retrieve a high-gain beam vector.

9. The method of claim 1, wherein obtaining first handover triggering information comprises the source TRP obtaining from a learning function a data set comprising the first handover triggering information.

10. The method of claim 1, wherein
the first set of beam characteristics comprises a first modulation and coding scheme (MCS),
the second set of beam characteristics further comprises a second MCS,
determining whether the second set of beam characteristics matches the first set of beam characteristics comprises determining whether the first MCS is substantially identical to the second MCS.

11. A source transmission and reception point (TRP), the source TRP comprising:
a data storage system comprising a memory; and
processing circuitry coupled to the data storage system, wherein the source TRP is configured to:
obtain first handover triggering information identifying a first handover triggering condition, the first handover triggering information comprising first beam information indicating a first set of beam characteristics;
communicate with a user equipment (UE) using a high-gain beam having a second set of beam characteristics;
obtain second beam information indicating the second set of beam characteristics;
determine whether the first handover triggering condition is present; and
initiate a handover of the UE from the source TRP to a target TRP as a result of determining that the first handover triggering condition is present, wherein
the source TRP is configured to determine whether the first handover triggering condition is present by performing a process comprising determining whether the second set of beam characteristics of the high-gain beam that is being used by the source TRP to communicate with the UE matches the first set of beam characteristics.

\* \* \* \* \*